July 3, 1956 A. C. HALTER ET AL 2,753,516

VOLTAGE LIMITER

Filed May 9, 1955

Inventors
Allan C. Halter
Donald E. King
by Howard M. Herriot
Attorney

United States Patent Office 2,753,516

Patented July 3, 1956

2,753,516

VOLTAGE LIMITER

Allan C. Halter, Milwaukee, and Donald E. King, West Allis, Wis., assignors to Allis-Chalmers Manufacturing Company, Milwaukee, Wis.

Application May 9, 1955, Serial No. 506,948

9 Claims. (Cl. 323—75)

Figure 2:
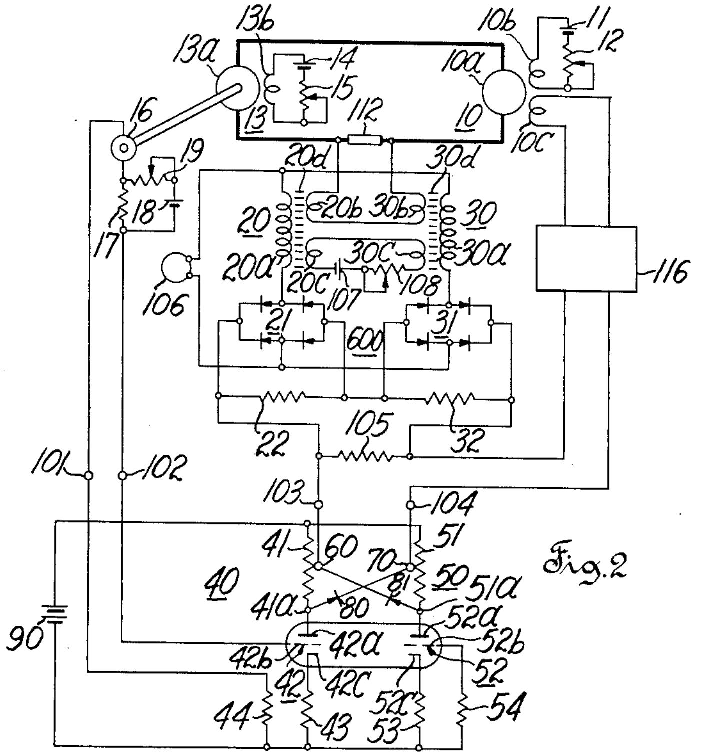

This invention relates in general to voltage limiting means and in particular to such means for differential variable voltage devices.

Differential variable voltage devices are well known wherein first and second impedance means are connected in parallel to receive unidirectional current from means including a power source, and wherein each of the impedance means has an intermediate output terminal thereon. When the impedance of one or both of the impedance means is varied to change the relative current in the two impedance means, the potential of one or both the output terminals changes to vary the output voltage thereacross. A variable output voltage of reversible polarity may thus be obtained across the output terminals. In these devices, the magnitude of the output voltage is limited by the inherent current limit characteristics of the impedance means.

Differential vacuum tube amplifiers and differential saturable reactor magnetic amplifiers are examples of such devices. In both magnetic amplifiers and vacuum tube amplifiers, saturation is the inherent limiting factor.

It is many times disadvantageous to allow the output voltage of these devices to increase to the value corresponding to the saturation condition because this type of voltage limiting does not usually occur abruptly or sharply and because the value to which the voltage rises may be higher than is desired.

In connection with this invention it has been discovered that these disadvantages are overcome by providing a unidirectional current conducting means for conducting current from a first point on the first impedance means to the second output terminal on the second impedance means, this first point being a point of lower potential than the first output terminal on the first impedance means.

The invention in this way simply and effectively limits the magnitude of the output voltage when of one polarity.

The magnitude of the output voltage, when of the other polarity, is similarly limited by connecting a unidirectional conducting means to conduct current from a second point on the second impedance means to the first output terminal on the first impedance means, this second point being a point of lower potential than the second output terminal on the second impedance means.

The value to which the voltage is to be limited is determined by the value of the portion of impedance between an output terminal and its associated point of lower potenial on the same impedance means. The voltage may be limited in either polarity to any preselected desired value less than the inherent limiting values of the first and second impedance means by adjusting or selecting this portion of impedance.

It is therefore an object of this invention to provide means for abruptly limiting the output voltage of a differential voltage device to a predetermined magnitude less than the inherent limit magnitude of the device. An additional object of this invention is to provide unidirectional conducting means for abruptly limiting the output voltage of a differential variable voltage device.

Another object of this invention is to provide unidirectional conducting means for abruptly limiting the output voltage of a differential voltage device to a predetermined magnitude less than the inherent limit magnitude when the output voltage is of one polarity.

It is a further object of this invention to provide rectifier means for limiting the output voltage of a differential voltage device to a first predetermined magnitude less than the inherent limit magnitude when the output voltage is of one polarity and to a second predetermined magnitude less than the inherent limit magnitude when the output voltage is of the opposite polarity.

Figure 1:
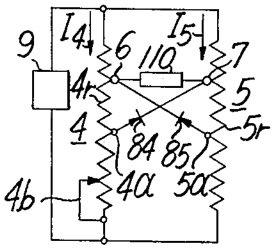
Figure 3:
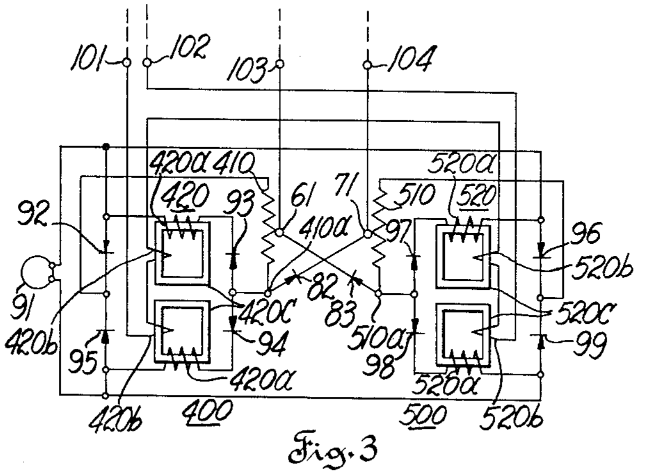

Objects and advantages other than those outlined above will appear from the following detailed description when read in connection with the accompanying drawing, in which:

Fig. 1 diagrammatically illustrates the invention;

Fig. 2 diagrammatically illustrates one embodiment of the invention applied to the regulation and control of a motor; and Fig. 3 diagrammatically illustrates another embodiment of the invention.

Referring to Fig. 1, the invention is shown embodied in a differential variable voltage device having a first impedance means 4 and a second impedance means 5 connected in parallel across means 9 which includes a power source and which supplies the two impedance means 4, 5 with unidirectional current as indicated by the arrows $I_4$, $I_5$. Impedance means 4 has thereon a first intermediate output terminal 6 and impedance means 5 has thereon a second intermediate output terminal 7. Connected between the output terminals is an output device 110. The impedance of impedance means 4 can be varied by any suitable means such as adjusting means 4*b*. Varying the impedance of impedance means 4 varies the current $I_4$ and thus varies the potential of terminal 6. This varies the output voltage across output terminals 6, 7.

With adjusting means 4*b* set so that output terminals 6, 7 are at the same potential, the output voltage is zero. Any change in the impedance of impedance means 4 from this balanced condition will result in an output voltage across output terminals 6, 7. If the impedance of impedance means 4 is increased, the output voltage has a first polarity wherein output terminal 6 is positive with respect to output terminal 7. If this impedance is decreased, the output voltage has the opposite or second polarity, with output terminal 7 being positive with respect to output terminal 6.

The output voltage of said first polarity is limited to a predetermined value by a unidirectional conducting means such as rectifier 84 connected between a point 4*a* and output terminal 7. Point 4*a* is a point on impedance means 4 having a lower potential than output terminal 6. The output voltage of this first polarity increases in magnitude with increases in the impedance of impedance means 4 until point 4*a* rises to a potential equal to the potential of terminal 7. Any further increase in the impedance of impedance means 4 tends to further raise the potential of point 4*a* and cause rectifier 84 to conduct current from point 4*a* to output terminal 7. This conduction tends to increase current through the portion of impedance means 4 above terminal 6 and to decrease current through the portion of impedance means 5 above terminal 7. This action maintains the output voltage across output terminals 6, 7 constant at the limit value reached when the potential of the point 4*a* became equal to the potential of output terminal 7. The output voltage is thus limited to this first limit value when the output voltage is of this first polarity. This first limit value is determined by the amount of impedance 4*r* between the terminal 6 and point 4*a*.

Without rectifier 84, the output voltage of this first polarity would be limited only by the minimum value of the current $I_4$ drawn by impedance means 4 when impedance means 4 was adjusted to its maximum value of impedance.

The rectifier 84 thus limits the output voltage of this first polarity to a first limit value lower than the value it would be limited to by the inherent characteristic of the circuit without rectifier 84. To preselect the value of the impedance portion *4r* placed between terminal 6 and point *4a,* one simply chooses the desired first limit value for the output voltage of this first polarity and divides this first limit value by the difference between the value of the current $I_4$ when the output voltage is zero and the above mentioned minimum value of the current $I_4$.

The output voltage, when of the second polarity, with output terminal 7 positive with respect to output terminal 6, is similarly limited by a second unidirectional conducting means such as rectifier 85 connected between point *5a* and output terminal 6. Point *5a* is a point on impedance means 5 having a lower potential than output terminal 7. When terminal 6 falls to the potential of point *5a,* the limiting action begins, and as the potential of terminal 6 tends to further fall, rectifier 85 conducts current from point *5a* to terminal 6 tending to increase the current through the portion of impedance means 5 above terminal 7 and to decrease the current through the portion of impedance means 4 above terminal 6. This action maintains the output voltage constant at the limit value reached when the potential of terminal 6 became equal to that of point *5a.* The output voltage is thus limited to this second limit value when the output voltage is of this second polarity. This second limit value is determined by the amount of impedance *5r* between terminal 7 and point *5a.*

Without rectifier 85, the output voltage of this second polarity would be limited only by the maximum value of the current $I_4$ drawn by impedance means 4 when the impedance means 4 was adjusted to its minimum value of impedance.

The rectifier 85 thus limits the output voltage of this second polarity to a second limit value lower than the value it would be limited to by the inherent characteristic of the current without rectifier 85. To preselect the value of the impedance portion *5r* placed between terminal 7 and point *5a,* one simply chooses the desired second limit value for the output voltage of this second polarity and divides this second limit value by the difference between above mentioned maximum value of the current $I_4$ and the value of current $I_4$ when the output voltage is zero.

The voltage may be limited to the same or different desired limit values for the two different polarities by selecting or adjusting the impedance values of the impedance portions *4r* and *5r.*

Referring to Fig. 2, the invention is shown embodied in a speed regulating and current limit control system for a direct current motor.

A direct current generator 10 drives a direct current motor 13 and the motor is regulated and controlled through a Ward-Leonard system. Generator 10 has an armature *10a,* a reference field winding *10b* and a control field winding *10c.* Field winding *10b* is energized from a battery 11 through a variable resistor 12. Motor 13 has an armature *13a* connected in series with the generator armature *10a.* The motor has a field winding *13b* energized by a battery 14 through a variable resistor 15.

A direct current tachometer generator 16, driven by motor 13, generates a D. C. voltage proportional to the speed of the motor. This speed signal voltage is opposed by a reference voltage across reference resistor 17 supplied by a battery 18 through a variable resistor 19. The difference between the speed signal voltage and the reference voltage is the control voltage which is impressed on control input terminals 101, 102 of a differential vacuum tube amplifier.

The differential vacuum tube amplifier comprises a first impedance means 40 and a second impedance means 50 which are connected in parallel across a battery 90 and are thus supplied with unidirectional current.

First impedance means 40 includes a fixed impedance element such as a resistor 41 and a variable impedance device such as a triode vacuum tube 42. Triode 42 has an anode *42a,* a grid *42b* and a cathode *42c.* A cathode resistor 43 is connected between the cathode *42c* and the negative terminal of battery 90.

Second impedance means 50 includes a fixed impedance element such as a resistor 51 and a variable impedance device such as a triode vacuum tube 52. Triode 52 has an anode *52a,* a grid *52b* and a cathode *52c.* A cathode resistor 53 is connected between the cathode *52c* and the negative terminal of battery 90.

Resistor 41 has a first intermediate output terminal 60 thereon and resistor 51 has a second intermediate output terminal 70 thereon. The grid 52b is held at a constant potential by connecting this grid to the negative terminal of battery 90 through a grid resistor 54. The impedance of triode 52 is thus held constant. The impedance of triode 42 is variable, however, and is controlled by the control voltage impressed on terminals 101, 102. Terminal 101 is connected through a grid resistor 44 to the negative terminal of battery 90 and terminal 102 is connected to grid *42b.*

The differential vacuum tube amplifier receives a reversible control voltage input at terminals 101, 102 which varies in magnitude and direction in response to deviations of the speed of motor 13 from the desired value of speed. The amplifier amplifies this input and produces a reversible output voltage across output terminals 60, 70 which varies in response to the magnitude and direction of the speed deviations of motor 13. This output voltage is fed through resistor 105 into power amplifier 116 which supplies control winding *10c* of generator 10 with a reversible direct current responsive to the magnitude and direction of the speed deviations of motor 13 to thus maintain motor 13 at the desired speed.

The operation of the speed regulating system is as follows:

Resistors 12 and 15 are adjusted so that the motor runs at the desired speed. The voltage generated by tachometer generator 16 then is equal and opposite to the voltage across reference resistor 17 and therefore the control voltage input to terminals 101, 102 is zero. The cathode resistors 43, 53, grid resistors 44, 54 and plate or load resistors 41, 51 are selected or adjusted so that, while the speed of motor 13 is at the desired value, the output voltage across output terminals 60, 70 is zero. There thus is zero input to power amplifier 116 and therefore zero input to control winding *10c* of generator 10. The system is thus in balance with the motor operating at the desired speed.

If the speed of motor 13 should deviate from the desired value to a lesser value, this decrease in speed causes tachometer generator 16 to generate a lower voltage than the opposing voltage across the reference resistor 17. The grid *42b* is therefore driven more negative. The impedance of triode 42 thus increases and the triode 42 conducts less current. The potential of output terminal 60 thus rises and an output voltage appears across output terminals 60, 70. This output voltage is of the polarity to cause power amplifier 116 to increase the current in control field winding *10c* in the direction to aid the field winding *10b* and thus increase the output of generator 10. The speed of the motor 13 thus increases until it reaches the desired value and then the system again is balanced.

If the speed of motor 13 should increase above the desired value, the operation is similar to that described above, except that grid *42b* is driven more positive. The triode 42 thus decreases its impedance and conducts more current, lowering the potential of output terminal 60. An output voltage now appears across output terminals 60, 70 of the opposite polarity, with terminal 70 positive with respect to terminal 60. This output voltage causes power amplifier 116 to increase the current in control field winding 10c in the opposite direction than described above. Now the field of winding 10c opposes the field of winding 10b to reduce the field of the generator and thus to reduce the output of the generator. The speed of the motor thus decreases to the desired value and the system again comes into balance.

To prevent the current in the generator and motor armature series loop from exceeding a safe limit value, a current limit network 600 is provided. This network produces a current limit signal across resistor 105 only when the loop current exceeds its predetermined safe limit value. This signal overrides the output voltage from the vacuum tube amplifier and thus controls generator 10 through amplifier 116 and field winding 10c to reduce the loop current to a value below the limit value.

Current limit network 600 includes a first saturable reactor 20 of the self-saturating type having a reactance winding 20a, a control winding 20b, a reference winding 20c and a core 20d and a second saturable reactor 30 of the self-saturating type having a reactance winding 30a, a control winding 30b, a reference winding 30c and a core 30d. The reactance windings 20a, 30a are each energized by a suitable source of alternating current such as A. C. generator 106. Winding 20a is connected across the A. C. generator through the A. C. terminals of a full wave rectifier bridge 21. Winding 30a is connected across the A. C. generator through the A. C. terminals of a full wave rectifier bridge 31. The D. C. terminals of rectifier bridge 21 are connected to a load resistor 22 and the D. C. terminals of rectifier bridge 31 are connected to a load resistor 32. The load resistors 22, 32 are connected together and to resistor 105 so that their voltages oppose and so that the difference therebetween is impressed on resistor 105. Control windings 20b, 30b are serially connected across an element in the loop such as a shunt 112 to receive a signal proportional to the loop current. The control windings 20b, 30b are so wound that they affect their associated cores oppositely, that is, as one saturates its associated reactor the other desaturates its associated reactor and vice versa. Reference windings 20c, 30c are connected in series with a battery 107 and a variable resistor 108 to receive a reference signal corresponding to the safe limit value of the loop current. Reference windings 20c, 30c are so wound that they desaturate their associated cores.

The network 600 thus produces across resistor 105 a reversible voltage signal proportional to the excess in magnitude of the loop current over its safe limit value, regardless of the direction of the loop current. The network thus acts as a current limiter during any reversal or "pump back" of current as well as during normal motoring.

The operation of the current limiting control system is as follows:

Resistor 108 and resistors 22, 32 are selected or adjusted so that reference windings 20c, 30c, desaturate their respective cores 20d, 30d an amount such that the voltages across each of the resistors 22, 32 will be equal and very small (practically zero) when the loop current is less than its limit value. When the loop current exceeds its limit value the control windings 20b, 30b receive a signal having a value corresponding to the limit value of loop current. While the loop current is less than the limit value, there is therefore no voltage impressed on resistor 105 because the opposed voltages across resistors 22, 32 are equal. If the loop current exceeds its limit value, then the windings 20b, 30b cause one of the reactors 20, 30 to become saturated and the other to become further desaturated. One of the output voltages across one of the resistors 22, 32 now greatly increases while the other is substantially unchanged. A current limit control voltage now appears across resistor 105. This current limit control voltage overrides whatever output voltage there may be across output terminals 60, 70 of the vacuum tube amplifier and causes power amplifier 116 to energize control field 10c so that the loop current is decreased to a value below the limit value.

To insure that the current limit control voltage signal from the current limiting network 600 will always override the voltage output of the vacuum tube amplifier to provide loop current limit when needed, voltage limiting means are provided for limiting the output voltage which appears across terminals 60, 70 of the vacuum tube amplifier.

The voltage limiting means comprise a rectifier 80 connected between point 41a and output terminal 70 for limiting the output voltage when of one polarity and a rectifier 81 connected between point 51a and output terminal 60 for limiting the output voltage when of the other polarity.

Without rectifiers 80 and 81, the voltage output would be limited only by the saturation and cutoff characteristics of triode 42. These inherent limits of the output voltage may be so high that when the vacuum tube amplifier is operating at or near its maximum output, the current limiting network is unable to override the amplifier and thus is unable to limit the loop current to a safe value.

Rectifier 80 limits the output voltage when of a first polarity with output terminal 60 positive with respect to output terminal 70. The output voltage of this first polarity increases in magnitude with increases in the impedance of triode 42 until point 41a rises to a potential equal to the potential of terminal 70. Any further increase in the impedance of triode 42 tends to further raise the potential of point 41a and cause rectifier 80 to conduct current from point 41a to output terminal 70. This conduction tends to increase current through the portion of resistor 41 above terminal 60 and to decrease current through the portion of resistor 41 above terminal 70. This action maintains the output voltage across output terminals 60, 70 constant at the limit value reached when the potential of the point 41a became equal to the potential of output terminal 70. The output voltage is thus limited to this first limit value when the output voltage is of this first polarity. This first limit value is determined by the amount of resistance between terminal 60 and point 41a.

The rectifier 80 thus limits the output voltage of this first polarity to a first limit value lower than the value it would be limited to by the inherent characteristic of the circuit without rectifier 80.

Rectifier 81 limits the output voltage when of the opposite or second polarity, with output terminal 70 positive with respect to output terminal 60. The output voltage of this second polarity increases in magnitude with decreases in the impedance of triode 42 until terminal 60 falls to the potential of point 51a, and then the limiting action of rectifier 81 begins. As the impedance of triode 42 further decreases, the potential of terminal 60 tends to further fall, and rectifier 81 conducts current from point 51a to terminal 60 tending to increase the current through the portion of resistor 51 above terminal 70 and to decrease the current through the portion of resistor 41 above terminal 60. This action limits the output voltage of this second polarity to a second limit value reached when the potential of terminal 60 became equal to the potential of point 51a. This second limit value is determined by the amount of resistance between terminal 70 and point 51a.

The rectifier 81 thus limits the output voltage of this second polarity to a second limit value lower than the value it would be limited to by the inherent characteristic of the circuit without rectifier 81.

The output voltage may be limited to the same or different desired limit values for the two polarities by selecting or adjusting the values of resistance between terminal 60 and point 41*a* and between terminal 70 and point 51*a*.

Referring to Fig. 3, the invention is shown embodied in a differential magnetic amplifier which could be substituted for the differential vacuum tube amplifier in the system illustrated in Fig. 1. This is indicated in Fig. 3 by showing the differential magnetic amplifier connected to terminals 101, 102 and 103, 104. These terminals and the dotted lines extending therefrom indicate the system shown in Fig. 1.

The differential magnetic amplifier comprises a first impedance means 400 and a second impedance means 500.

Impedance means 400 includes a first fixed impedance element such as a resistor 410 and a first variable impedance device such as a saturable reactor device 420. The saturable reactor device 420 has reactance windings 420*a*, control windings 420*b* and cores 420*c*.

Impedance means 500 includes a second fixed impedance element such as a resistor 510 and a second variable impedance device such as a saturable reactor device 520. The saturable reactor device 520 has reactance windings 520*a*, control windings 520*b* and cores 520*c*.

Resistor 410 has a first intermediate output terminal 61 thereon and resistor 510 has a second intermediate output terminal 71 thereon.

The A. C. generator 91 and rectifiers 92, 93, 94, 95, 96, 97, 98 and 99 comprise means including a power source for supplying unidirectional current to the first and second impedance means 400, 500 which are connected in parallel across this source of unidirectional current.

Control windings 420*b*, 520*b* are connected in series across input terminals 101, 102. Normally, the control voltage input to terminals 101, 102 is zero and the impedance of each of the reactors 420, 520 is then equal. Under this balanced condition, the resistors 410, 510 draw equal current and the output terminals 61, 71 are at equal potentials so that the output voltage thereacross is zero. The control windings 420*b*, 520*b* are wound so that any control voltage input to terminals 101, 102 drives one of the reactors 420, 520 toward saturation and the other away from saturation. The impedance of one of the reactors thus decreases while the impedance of the other increases. One of the resistors 410, 510 thus receives more current and the other receives less current. This causes the potential of one of the output terminals 61, 71 to decrease while the potential of the other increases to produce an output voltage across output terminals 61, 71.

It is thus seen that a reversible control voltage input to terminals 101, 102 causes a reversible output voltage across output terminals 61, 71.

Rectifiers 82, 83 provide voltage limiting means for limiting the output voltage across output terminals 61, 71 to limit values lower than the inherent voltage limit values the current would have without rectifiers 82, 83.

Without rectifiers 82, 83 the output voltage would be limited only by the saturation characteristics of saturable reactors 420, 520.

Rectifier 82 limits the output voltage when of a first polarity with output terminal 61 positive with respect to output terminal 71. Rectifier 82 is connected between point 410*a* and output terminal 71. Point 410*a* is a point of lower potential than output terminal 61.

The output voltage of this first polarity increases in magnitude with increases in the impedance of reactor 420 and decreases in the impedance of reactor 520; the potentials of terminal 61 and point 410*a* rising and the potential of terminal 71 falling. The output voltage increases until the potentials of point 410 and terminal 71 are equal. Any further increase in the impedance of reactor 420 and decrease in the impedance of reactor 520 tends to further raise the potential of point 410*a* and lower the potential of terminal 71, causing rectifier 82 to conduct current from point 410*a* to terminal 71. This conduction tends to increase current in the portion of resistor 410 above output terminal 61 and to decrease current in the portion of resistor 510 above output terminal 71. This action maintains the output voltage across output terminals 61, 71 constant at the limit value reached when the potentials of point 410*a* and terminal 71 became equal. The output voltage is thus limited to this first limit value when the output voltage is of this first polarity.

The rectifier 82 thus limits the output voltage of the first polarity to a first limit value lower than the value it would be limited to by the inherent limiting characteristic of the circuit without rectifier 82.

Rectifier 83 limits the output voltage when of the opposite or second polarity, with output terminal 71 positive with respect to output terminal 61. Rectifier 83 is connected between point 510*a* and output terminal 61. Point 510*a* is a point of lower potential than terminal 71.

The output voltage of this second polarity increases in magnitude with increases in the impedance of reactor 520 and decreases in the impedance of reactor 420; the potentials of terminal 71 and point 510*a* rising and the potential of terminal 61 falling. The output voltage increases until the potentials of point 510*a* and terminal 61 are equal. Any further increase in the impedance of reactor 520 and decrease in the impedance of reactor 420 tends to further raise the potential of point 510*a* and lower the potential of terminal 61, causing rectifier 83 to conduct current from point 510*a* to terminal 61. This conduction tends to increase current in the portion of resistor 510 above terminal 71 and to decrease current in the portion of resistor 410 above terminal 61. This action maintains the output voltage across output terminals 61, 71 constant at a limit value reached when the potentials of point 510*a* and terminal 61 became equal. The output voltage is thus limited to this second limit value when the output voltage is of this second polarity.

The rectifier 83 thus limits the output voltage of this second polarity to a second limit value lower than the value it would be limited to by the inherent limiting characteristic of the circuit without rectifier 83.

The output voltage across output terminals 61, 71 may be limited to the same or different limit values for the two polarities by selecting or adjusting the values of resistance between terminal 61 and point 410*a* and between terminal 71 and point 510*a*.

It will be apparent to those skilled in the art that various changes and modifications may be made in the embodiments illustrated and described herein without departing from the spirit of the invention or from the scope of the appended claims.

It is claimed and desired to secure by Letters Patent:

1. In combination, first and second impedance means connected in parallel, means including a power source for supplying said first and second impedance means with unidirectional current, said first impedance means having a first intermediate output terminal, said second impedance means having a second intermediate output terminal, an output device connected to said output terminals, means for varying the impedance of said first impedance means to vary the output voltage across said output terminals, said first impedance means having a point thereon of lower potential than said first output terminal, and limit means comprising unidirectional current conducting means connected between said point and said second output terminal for conducting current from said point to said second output terminal when the potential of said point is greater than the potential of said second output terminal to thereby limit said output voltage.

2. In combination, first and second impedance means connected in parallel, means including a power source for supplying said first and second impedance means with unidirectional current, said first impedance means having a first intermediate output terminal, said second impedance means having a second intermediate output terminal, an output device connected to said output terminals, means for increasing the impedance of said first impedance means to increase the potential of said first output terminal for varying the output voltage between said output terminals, said first impedance means having a point thereon of lower potential than said first output terminal, and limit means comprising unidirectional current conducting means connected between said point and said second output terminal for conducting current from said point to said second output terminal when the potential of said point is greater than the potential of said second output terminal to thereby limit said output voltage.

3. In combination, first and second impedance means connected in parallel, means including a power source for supplying said first and second impedance means with unidirectional current, said first impedance means having a first intermediate output terminal, said second impedance means having a second intermediate output terminal, an output device connected to said output terminals, means for decreasing the impedance of said first impedance means to decrease the potential of said first output terminal for varying the output voltage between said output terminals, said second impedance means having a point thereon of lower potential than said second output terminal, and limit means comprising unidirectional current conducting means connected between said point and said first output terminal for conducting current from said point to said first output terminal when the potential of said point is greater than the potential of said first output terminal to thereby limit said output voltage.

4. In combination, first and second impedance means connected in parallel, means including a power source for supplying said first and second impedance means with unidirectional current, said first impedance means having a first intermediate output terminal, said second impedance means having a second intermediate output terminal, an output device connected to said output terminals, means for varying the impedance of said first impedance means to vary the output voltage across said output terminals, said first impedance means having a first point thereon of lower potential than said first output terminal, said second impedance means having a second point thereon of lower potential than said second output terminal, and limit means for limiting said output voltage comprising first unidirectional current conducting means connected between said first point and said second output terminal for conducting current from said first point to said second output terminal when the potential of said first point is greater than the potential of said second output terminal and second unidirectional current conducting means connected between said second point and said first output terminal for conducting current from said second point to said first output terminal when the potential of said second point is greater than the potential of said first output terminal.

5. The combination comprising a first impedance means having a first fixed impedance element and a first variable impedance device connected in series, a second impedance means, said first and second impedance means being connected in parallel, means including a power source for supplying said first and second impedance means with unidirectional current, said first element having a first intermediate output terminal, said second impedance means having a second intermediate output terminal, an output device connected to said output terminals, means for varying the impedance of said first impedance device to vary the output voltage across said output terminals, said first element having a point thereon of lower potential than said first output terminal, and limit means comprising unidirectional current conducting means connected between said point and said second output terminal for conducting current from said point to said second output terminal when the potential of said point is greater than the potential of said second output terminal to thereby limit said output voltage.

6. The combination comprising a first impedance means having a first fixed impedance element and a first variable impedance device connected in series, a second impedance means, said first and second impedance means being connected in parallel, means including a power source for supplying said first and second means with unidirectional current, said first element having a first intermediate output terminal, said second impedance means having a second intermediate output terminal, an output device connected to said output terminals, means for varying the impedance of said first impedance device to vary the output voltage across said output terminals, said second impedance means having a point thereon of lower potential than said second output terminal, and limit means comprising unidirectional current conducting means connected between said point and said first output terminal for conducting current from said point to said first output terminal when the potential of said point is greater than the potential of said first output terminal to thereby limit said output voltage.

7. The combination comprising a first impedance means having a first fixed impedance element and a first variable impedance device connected in series, a second impedance means, said first and second impedance means being connected in parallel, means including a source of power for supplying said first and second impedance means with unidirectional current, said first element having a first intermediate output terminal, said second impedance means having a second intermediate output terminal, an output device connected to said output terminals, means for varying the impedance of said first impedance device to vary the output voltage across said output terminals, said first element having a first point thereon of lower potential than said first output terminal, said second impedance means having a second point thereon of lower potential than said second output terminal, and limit means for limiting said output voltage, said limit means comprising first unidirectional current conducting means connected between said first point and said second output terminal for conducting current from said first point to said second output terminal when the potential of said first point exceeds the potential of said second output terminal, and second unidirectional current conducting means connected between said second point and said first output terminal for conducting current from said second point to said first output terminal when the potential of said second point exceeds the potential of said first output terminal.

8. The combination comprising a first impedance means including a resistor and a first vacuum tube triode, said triode having an anode, a grid and a cathode, said resistor being connected in series with said anode and grid, a second impedance means, said first and second impedance means being connected in parallel, means including a source of power for supplying said first and second impedance means with unidirectional current, said resistor having a first intermediate output terminal, said second impedance means having a second intermediate output terminal, an output device connected to said output terminals, means for varying the potential of said grid to vary the impedance of said triode for varying the output voltage across said output terminals, said resistor having a first point thereon of lower potential than said first output terminal, and limit means for limiting said output voltage, said limit means comprising a rectifier connected between said first point and said second output terminal for conducting current from said first point to said second output terminal when the potential of said first point exceeds the potential of said second output terminal.

9. The combination comprising a first impedance means including a resistor and a saturable reactor connected in series, a second impedance means, said first and second impedance means being connected in parallel, means including a power source for supplying said first and second means with unidirectional current, said resistor having a first intermediate output terminal, said second impedance means having a second intermediate output terminal, an output device connected to said output terminals, means for varying the saturation of said reactor to vary the impedance of said reactor for varying the output voltage across said output terminals, said resistor having a point thereon of lower potential than said first output terminal, and limit means comprising a rectifier connected between said point and said second output terminal for conducting current from said point to said second output terminal when the potential of said point is greater than the potential of said second output terminal to thereby limit said output voltage.

No references cited.